(12) United States Patent
Wurster

(10) Patent No.: US 9,107,152 B1
(45) Date of Patent: Aug. 11, 2015

(54) BEACON PROTOCOL ADVERTISING BI-DIRECTIONAL COMMUNICATION AVAILABILITY WINDOW

(71) Applicant: Gimbal, Inc., San Diego, CA (US)

(72) Inventor: Charles S. Wurster, San Diego, CA (US)

(73) Assignee: Gimbal, Inc., San Diego, CA (US)

( * ) Notice: Subject to any disclaimer, the term of this patent is extended or adjusted under 35 U.S.C. 154(b) by 0 days.

(21) Appl. No.: 14/645,296

(22) Filed: Mar. 11, 2015

(51) Int. Cl.
*H04W 40/24* (2009.01)
*H04M 1/725* (2006.01)
*H04M 1/66* (2006.01)
*H04L 12/807* (2013.01)

(52) U.S. Cl.
CPC ............. *H04W 40/244* (2013.01); *H04L 47/27* (2013.01); *H04M 1/66* (2013.01); *H04M 1/72525* (2013.01); *H04M 1/72572* (2013.01)

(58) Field of Classification Search
CPC ... H04W 40/24; H04W 40/00; H04W 40/244; H04L 47/27; H04M 1/66; H04M 1/72525; H04M 1/72572
See application file for complete search history.

(56) References Cited

U.S. PATENT DOCUMENTS

| | | |
|---|---|---|
| 5,784,028 A | 7/1998 | Corman et al. |
| 5,812,086 A | 9/1998 | Bertiger et al. |
| 6,052,786 A | 4/2000 | Tsuchida |
| 6,513,015 B2 | 1/2003 | Ogasawara |
| 6,536,658 B1 | 3/2003 | Rantze |
| 6,970,092 B2 | 11/2005 | Hum et al. |
| 7,260,835 B2 | 8/2007 | Bajikar |
| 7,376,583 B1 | 5/2008 | Rolf |
| 7,413,121 B2 | 8/2008 | Goel et al. |
| 7,658,327 B2 | 2/2010 | Tuchman et al. |
| 7,737,861 B2 | 6/2010 | Lea et al. |
| 7,752,329 B1 | 7/2010 | Meenan et al. |
| 7,791,455 B1 | 9/2010 | MacLean, III et al. |
| 7,849,318 B2 | 12/2010 | Zhang et al. |
| 7,880,616 B2 | 2/2011 | Kanagala et al. |
| RE42,435 E | 6/2011 | Katz |
| 7,962,361 B2 | 6/2011 | Ramchandani et al. |

(Continued)

FOREIGN PATENT DOCUMENTS

| | | |
|---|---|---|
| EP | 1626363 A1 | 2/2006 |
| EP | 2200218 A1 | 6/2010 |

(Continued)

OTHER PUBLICATIONS

Anonymous. "Stream cipher." *Wikipedia: The Free Encyclopedia.* Wikimedia Foundation, Inc. Last modified Jan. 20, 2012. Web. Feb. 6, 2012. [Retrieved on Sep. 18, 2014 Internet Archive WayBackMachine].

(Continued)

*Primary Examiner* — Anh Ngoc Nguyen
(74) *Attorney, Agent, or Firm* — Mintz Levin Cohn Ferris Glovsky and Popeo, P.C.

(57) ABSTRACT

A beacon wireless transmits a sequence of one or more data packets that each or together comprise an identifier. A portion of the data packets specify an availability window during which a receiver forming part of the beacon can receive data transmissions. The receiver does not receive data transmissions outside of the availability window. Thereafter, the receiver is activated during the availability window to enable receipt of data transmissions to the beacon. Related systems, apparatus, methods, and articles are also described.

102 Claims, 5 Drawing Sheets

(56) References Cited

U.S. PATENT DOCUMENTS

| | | | |
|---|---|---|---|
| 8,023,895 B2 | 9/2011 | Smith | |
| 8,050,984 B2 | 11/2011 | Bonner et al. | |
| 8,090,399 B2 | 1/2012 | Howarter et al. | |
| 8,145,125 B2 | 3/2012 | Masoian et al. | |
| 8,160,577 B2 | 4/2012 | Bailin et al. | |
| 8,990,556 B1 | 3/2015 | Wuster et al. | |
| 2002/0062251 A1 | 5/2002 | Anandan et al. | |
| 2004/0002897 A1 | 1/2004 | Vishik | |
| 2004/0082343 A1 | 4/2004 | Kim et al. | |
| 2004/0198221 A1 | 10/2004 | Bin et al. | |
| 2006/0036485 A1 | 2/2006 | Duri et al. | |
| 2006/0178986 A1 | 8/2006 | Giordano et al. | |
| 2008/0107274 A1 | 5/2008 | Worthy | |
| 2008/0123683 A1 | 5/2008 | Cheng et al. | |
| 2008/0187137 A1 | 8/2008 | Nikander et al. | |
| 2009/0103722 A1 | 4/2009 | Anderson et al. | |
| 2009/0185677 A1 | 7/2009 | Bugbee | |
| 2009/0210932 A1 | 8/2009 | Balakrishnan et al. | |
| 2009/0254416 A1 | 10/2009 | Nomula | |
| 2009/0315704 A1 | 12/2009 | Rosing et al. | |
| 2010/0027783 A1 | 2/2010 | Yup | |
| 2010/0070369 A1 | 3/2010 | Fenton et al. | |
| 2010/0203833 A1 | 8/2010 | Dorsey | |
| 2010/0267375 A1 | 10/2010 | Lemmon et al. | |
| 2010/0287250 A1 | 11/2010 | Carlson et al. | |
| 2011/0007678 A1* | 1/2011 | Kneckt et al. | 370/311 |
| 2011/0032916 A1 | 2/2011 | Lee | |
| 2011/0138192 A1 | 6/2011 | Kocher et al. | |
| 2011/0176465 A1 | 7/2011 | Panta et al. | |
| 2011/0179064 A1 | 7/2011 | Russo | |
| 2011/0188431 A1* | 8/2011 | Krueger et al. | 370/311 |
| 2012/0029691 A1 | 2/2012 | Mockus et al. | |
| 2012/0047011 A1 | 2/2012 | Rippetoe et al. | |
| 2012/0201383 A1 | 8/2012 | Matsuo | |
| 2012/0207062 A1* | 8/2012 | Corbellini et al. | 370/256 |
| 2012/0207302 A1 | 8/2012 | Alexander et al. | |
| 2012/0209744 A1 | 8/2012 | Mullen et al. | |
| 2012/0226537 A1 | 9/2012 | Subbarao et al. | |
| 2012/0239504 A1 | 9/2012 | Curlander et al. | |
| 2012/0278172 A1 | 11/2012 | Mercuri et al. | |
| 2013/0006726 A1 | 1/2013 | Tijink et al. | |
| 2013/0214909 A1 | 8/2013 | Meijers et al. | |
| 2013/0217332 A1 | 8/2013 | Altman et al. | |
| 2013/0282438 A1 | 10/2013 | Hunter et al. | |
| 2013/0297422 A1 | 11/2013 | Hunter et al. | |
| 2014/0133656 A1 | 5/2014 | Wurster et al. | |
| 2014/0274200 A1* | 9/2014 | Olson | 455/552.1 |
| 2015/0055578 A1* | 2/2015 | Kountouris | 370/329 |

FOREIGN PATENT DOCUMENTS

| | | |
|---|---|---|
| KR | 20090095869 A | 9/2009 |
| WO | WO-02073864 A2 | 9/2002 |
| WO | WO-2005025127 A1 | 3/2005 |
| WO | WO-2007059558 A1 | 5/2007 |
| WO | WO-2009130796 A1 | 10/2009 |
| WO | WO-2010117364 A1 | 10/2010 |
| WO | WO-2012035149 A1 | 3/2012 |
| WO | WO-2013034924 A1 | 3/2013 |

OTHER PUBLICATIONS

Barahim, M.Z. et al. "Low-Cost Bluetooth Mobile Positioning for Location-based Application," *IEEE* (2007)1-4. ISBN: 1-4244-1007-X. [Retrieved on Sep. 17, 2014].

Chaudhry M A, R., and Sheikh, Dr. Muhammad Imran. "Protocols Stack & Connection Establishment in Bluetooth Radio." *IEEE*. (2002):48-55. ISBN: 0-7803-7505-X. [Retrieved on Sep. 17, 2014].

Kim, H.W., et al. "Symmetric Encryption in RFID Authentication Protocol for Strong Location Privacy and Forward-Security." *IEEE*. Hybrid Information Technology (ICHIT '06). (2006):718-723. ISBN: 0-7695-2674-8/06. [Retrieved on Sep. 17, 2014].

Schneider M A., and Felten, Edward W. "Efficient Commerce Protocols based on One-time Pads." *IEEE* (2000):317-326. ISBN:1063-9527/00. [Retrieved on Sep. 17, 2014].

Tsudik, Gene. "A Family of Dunces: Trivial RFID Identification and Authentication Protocols". Borisov, N. and Golle, P. (Eds.): PET 2007. LNCS 4776.(2007):45-61. [Retrieved on Sep. 17, 2014].

Zuo, Yanjun. "Secure and private search protocols for RFID systems.", *Inf Sys Front* . (2010), 12:507-519. Published online: Aug. 28, 2009. DOI: 10.1007/s10796-009-9208-6. [Retrieved on Sep. 17, 2014].

\* cited by examiner

BEACON PROTOCOL ADVERTISING BI-DIRECTIONAL COMMUNICATION AVAILABILITY WINDOW

TECHNICAL FIELD

The subject matter described herein relates to a beacon and related protocol for transmitting data within beacon packets that identify windows in which such beacon is available for bi-directional communication.

BACKGROUND

Beacons are increasingly being used for a variety of applications because of their low power requirements and low costs. Beacons transmit identifiers (typically a universally unique identifier) that are detected by applications or operating systems on client devices (e.g., mobile phones, etc.) and/or infrastructure devices (e.g., wireless access points, dedicated beacon transceivers, any Internet of Things (IoT) device capable of detecting beacons and communicating with a server, etc.). In many cases, such identifiers are transmitted in plain text (e.g., not encrypted, etc.) that can be readily detected and consumed by a variety of client devices. Such detection can be used, in some scenarios, to initiate an action on the client device which may be based on the specific location of the client device as indicated by detecting the nearby beacon. For example, companies use beacons to extend the effectiveness of their mobile applications by adding real-time location context to their offers and services which then can engage customers in the right manner, at the right place and the right time. In addition, companies are empowered to increase sales and drive loyalty by delivering highly relevant content and services to consumers who are physically present in their venues where their products and services can be found.

Beacons are becoming increasingly compact and many include self-contained power sources (e.g., batteries, etc.). Efficient operations are important to extend the time period in which such beacons can operate without having to replace or otherwise service such power sources.

SUMMARY

In one aspect, a beacon wireless transmits a sequence of one or more data packets that each or together comprise an identifier. A portion of the data packets specify an availability window during which a receiver forming part of the beacon can receive data transmissions. The receiver does not receive data transmissions outside of the availability window. Thereafter, the receiver is activated during the availability window to enable receipt of data transmissions to the beacon.

The availability window can specify an absolute time during which the beacon can receive data transmissions. In other variations, the availability window can specify a relative time during which the beacon can receive data transmissions.

The beacon can receive configuration information for the beacon during the availability window. Firmware of the beacon can be modified in response to receipt of the configuration information. At least one operating parameter of the beacon can be modified in response to receipt of the configuration information. The at least one operating parameter can include, for example, one or more of a rate at which the sequence of data packets is transmitted, whether or not a rolling code is transmitted in the sequence of data packets, a rate at which a rolling code encapsulated in the sequence of data packets is changed, a rate at which a media access control (MAC) address changes, power at which the sequence of data packets is transmitted, a universally unique identifier (UUID) for the beacon, a major value for the beacon, a minor value for the beacon, measured power for the beacon, a version/type of packets in the sequence of packets, a periodicity of the availability window, a length of time during which the availability window is open, a timestamp for the availability window, or a time period for a subsequent availability window.

The firmware can be modified, in some cases, by opening a connection between the client device and a remote computing device to data encapsulating a firmware update. The client device can then transmit data encapsulating the firmware update to the beacon.

Software executing on or accessed by a client device can detect at least one packet transmitted by the beacon. Thereafter, the client device can relay at least a portion of the transmitted packet to a server. The server can then determine, based on the relayed portion of the transmitted packet, that the software is authorized to be informed of an identity and metadata of the beacon. In response, the server can then transmit data to the client device that includes an identifier and metadata for the beacon. The software executing on or accessed by the client device can initiate at least one action using the identifier and the metadata. At least a portion of each data packet can be obfuscated such that, the determination by the server can comprise parsing the obfuscated at least a portion of each data packet.

Software executing on or accessed by a client device can detect at least one packet transmitted by the beacon including the availability window. Thereafter, the client device can relay at least a portion of the transmitted packet to a server. The server can then determine, based on the relayed at least a portion of the transmitted packet, that the software is authorized to convey the configuration information to the beacon. Next, the server can then transmit data to the client device that comprises the configuration information for the beacon. The client device can then, during the availability window, transmit data including the configuration information.

The wireless transmission can include at least one of: radio waves, audio waves, or light waves.

In some variations, software executing on or accessed by a client device can detect at least one packet transmitted by the beacon and relay, at least a portion of the transmitted at least one packet, to a server. The server can determine, based on the relayed at least a portion of the at least one transmitted packet, that the software should modify firmware and/or one or more operating parameters of the beacon during the availability window. The server can then transmit, to the client device, data for the client device to transmit to the beacon during the availability window which, when received by the beacon, causes the firmware and/or one or more operating parameters of the beacon to change.

In an interrelated aspect, software executing on or accessed by a client device wirelessly receives, from a beacon, a sequence of one or more data packets that each comprise an identifier. At least one of such packets specifies an availability window during which a receiver forming part of the beacon can receive data transmissions. The receiver can be configured such that it does not receive data transmissions outside of the availability window. The client device then transmits data transmission to the beacon solely during the availability window.

In a further interrelated aspect, a system can include at least one beacon, at least one data processor, and memory storing instructions which, when executed by the at least one data processor, implement operations including: wirelessly transmitting, by the at least one beacon, a sequence of one or more data packets that each comprise an identifier such that a portion of the packets specify an availability window during which a receiver forming part of the at least one beacon can receive data transmissions and the receiver does not receive data transmissions outside of the availability window. The operations can also include activating the receiver during the availability window to enable receipt of data transmissions to the at least one beacon.

Non-transitory computer program products (i.e., physically embodied computer program products) are also described that store instructions, which when executed by one or more data processors of one or more computing systems, causes at least one data processor to perform operations herein. Similarly, computer systems (which can additionally include one or more beacons) are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter enables beacons to have efficient bi-directional communication with client devices which, in turn, can extend beacon battery life and otherwise reduce beacon power consumption.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to the transmission of data from a beacon that includes an identifier and, at times, an availability window during which the beacon is available for bi-directional communications.

The current subject matter can be used in connection with a beacon platform such as that described in U.S. patent application Ser. No. 13/773,379 entitled: "Platform for Wireless Identity Transmitter and System Using Short Range Wireless Broadcast" and published as U.S. Pat. App. Pub. No. 2013/0217332, U.S. patent application Ser. No. 13/833,110 entitled: "Retail Proximity Marketing" and published as U.S. Pat. App. Pub. No. 2013/0297422, and U.S. patent application Ser. No. 14/459,138 filed on Aug. 13, 2014 and entitled: "Sharing Beacons", the contents of each of which are hereby fully incorporated by reference.

Figure 1:
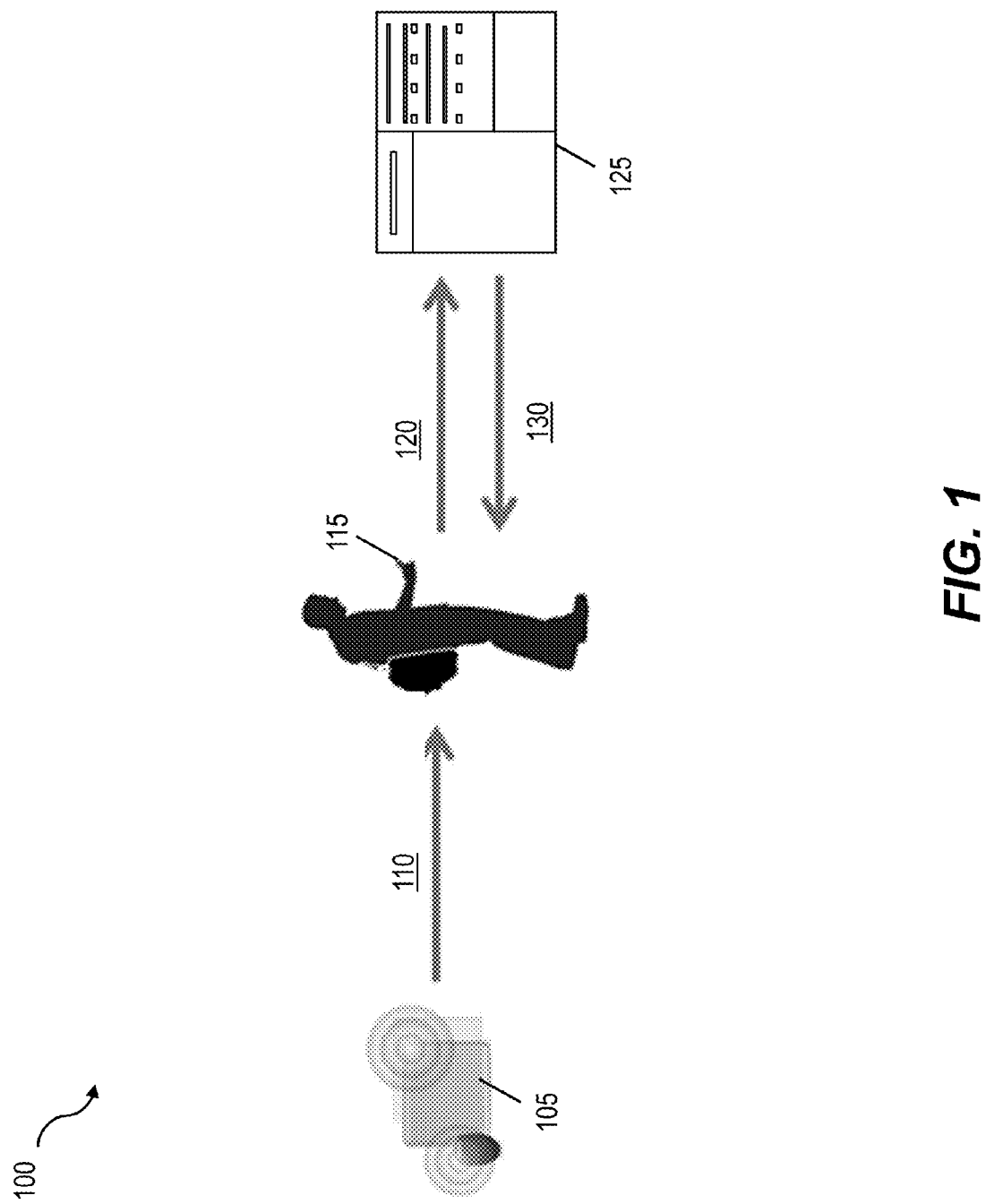
FIG. 1 is a first diagram illustrating signaling among a beacon, a client device, and a beacon server.

FIG. 1 is a first diagram 100 illustrating interaction among a beacon 105, a client device 115, and a beacon server 125. The beacon 105 periodically emits a transmission that can be used to identify a beacon or collection of beacons. The transmission can take any form of wireless transmission including, as some examples, Bluetooth, Bluetooth low energy, Zigbee, WiFi, NFC, and/or any other radio, microwave, infrared, and light technologies. The transmission may be static data or may change periodically. In either case, it may result in the need of a beacon server (sometimes referred to as a cloud server) to identify the beacon. In some cases, the transmission can include additional data such as metadata that characterizes beacon and/or data that specifies or otherwise characterizes an availability window (either in absolute time or relative time) during which the beacon can receive data. Thereafter, at 110, software resident on a client device 115 (e.g., a mobile phone, Internet of Things (IoT) device, etc.) detects the transmission. The client device 115 (via the software) next, at 120, relays data characterizing the detected transmission to a beacon server 125. The beacon server 125 then determines whether the software on the client device 115 is authorized to receive the beacon identification and/or metadata ("beacon information"). After such determination is made, the beacon server 125, at 130, sends the beacon information in addition to any metadata the server has about the beacon to the software on the client device 115 and what actions the software on the client device 115 is permitted to take. If the software on client device 115 is not authorized to receive the beacon information, the beacon server 125, at 130, can send an indication that the software no longer needs to consider the beacon locally while sending sightings of such beacon back to the beacon server 125 or it can simply not relay these beacon transmissions for some period of time (i.e., ignore beacon for five minutes, etc.). In some cases, the transmissions by the beacon 105 are secure (e.g. encrypted, obscured, obfuscated, uses rotating identifiers, etc.) such that the beacon and/or availability window can only be correctly identified via an interaction with the beacon server 125 (whether in response to the relayed beacon transmissions 120 or as an earlier data transfer so that relevant information can be cached on the client device 115 to enable determining the beacon information based on the transmission(s) without needing to relay the beacon transmissions 120). In other cases, the transmissions by the beacon 105 are not secure such that the client device 115 can correctly identify the beacon and/or the availability window without an interaction with the beacon server 125 (however in some cases the client device 115 can still interact with the beacon server 125 to obtain any further metadata and/or data specifying permitted actions that are stored on server 125).

Various types of actions can be initiated based on the software identifying the beacon. Sample actions include, for example, presenting a notification to the end-user, presenting or changing a user interface, logging that the end-user was near a beacon at a certain time and dwelled nearby it for an amount of time, etc. Further, various types of actions can be initiated using the software (or other software on a client device 115) during the availability window. For example, the client device 115 can be used to change the firmware of the beacon 105 and/or one or more operating parameters or initiate a connection that will permit such an action during the availability window (because during such time the beacon 105 is able to receive data packet transmissions from the client device 115).

Figure 2:
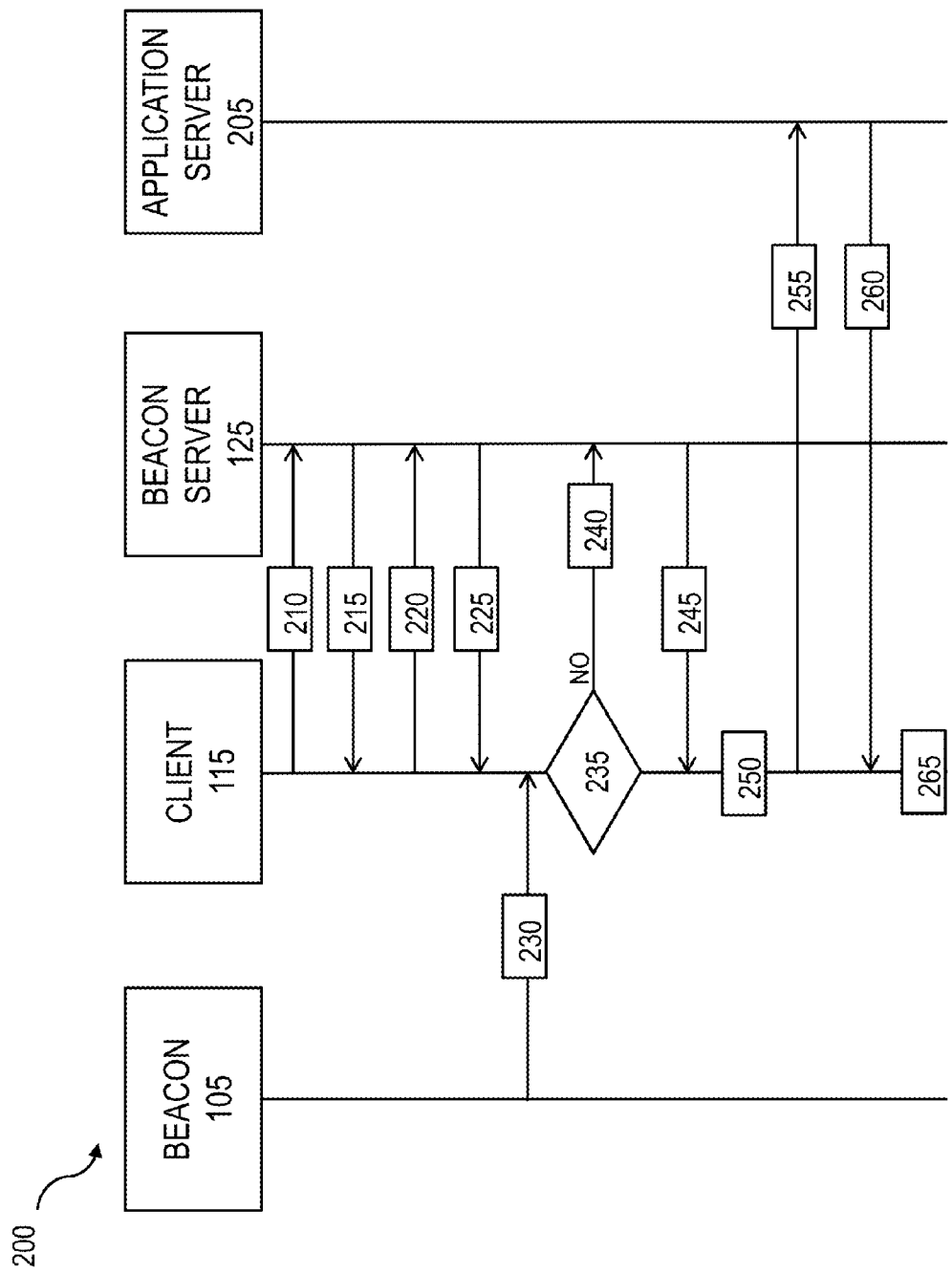
FIG. 2 is a diagram illustrating signaling among a beacon, a client device, a beacon server, and an application server.

FIG. 2 is a second diagram 200 illustrating interaction among a beacon 105, a client device 115, and a beacon server 125, and additionally among an application server 205 (which pertains to applications that can be executed on the client device 115). After software is installed on the client device 115, and as part of a registration process, the client device 115, at 210, can transmit an issue software identifier request to the beacon server 125. The beacon server 125 can reply, at 215, with an identification for the software. Such identification can be a unique alphanumeric string. The client device 115 can subsequently transmit, at 220, contextual data. Such contextual data can include information about an end-user of the client device 115, current location of the client device 115 and the like, previous beacon detections by the software, location history of the end-user (e.g. a list of latitude and longitude points the end-user has dwelled at), and the like. Thereafter, the beacon server 125 can transmit, at 225, data to the software on the client device 115 that includes information about beacon(s) 105 that are located near the current location of the client device, and/or otherwise determined to be relevant 115 and/or what actions, if any, should be triggered in response to the detection of beacon(s) 105. The client device 115 can store such application triggering data locally (i.e., such data can be cached) on the client device 115 so that actions may be triggered automatically without the need for subsequent interaction with the beacon server 125 or the application server 205.

At some later point, the client device 115 can, at 230, be within a range of the beacon 105 such that the software can detect a transmission from the beacon 105 that identifies such beacon. It can then be determined, at 235, whether there the client device 115 includes cached authorization for identifying the beacon as well as application triggering data that is associated with the identity of such beacon. In cases in which the client device 115 is an IoT device, the client device 115 need not locally resolve the identity of the beacon 105. In cases, in which the identifier is encrypted, the encrypted identifier along with the corresponding unencrypted identifier may be locally cached. If it is determined that there is cached authorization and application triggering data, the software notifies the application it is associated with or operating system on the client device 115 which, in turn, can trigger one or more actions. In addition, the detection of the beacon 105 and the triggering of actions can be stored in a log that can, at some later point, be transmitted to the beacon server 125. In some cases, time limits and other restrictions can be placed on the cache so that any stored identifiers are flushed or otherwise removed. Further, in cases in which the beacon 105 transmits rolling identifiers (i.e., identifiers that periodically change, etc.) older identifiers for the beacon 105 that may no longer help identify the beacon 105 (even if they are cached) are flushed or otherwise removed. Such restrictions can act to force the client device 115 to interact with the beacon server 125 to identify beacon(s) 105 in the future.

If it is determined that there is no cached authorization, then, at 240, the software can relay the secure beacon transmission to beacon server 125 and request authorization as well as any application trigger data. The beacon server 125 can then determine whether the software is authorized to be informed of the beacon identity and which actions, if any, to take in connection with the detected beacon 105 and, if authorized at 245, transmit the beacon identity, metadata and application triggering data back to the client device 115 for local storage (i.e., caching, etc.). For secure transmission, the beacon identity can comprise an encrypted identifier/unencrypted identifier pair. Furthermore, if the beacon 105 uses rolling identifiers, future encrypted identifier/unencrypted identifier pairs can be transmitted by the beacon server 125 to the client device 115 so that they can be cached. For example, the next N encrypted/unencrypted identification pairs can be generated by the beacon server 125 and sent to the client device 115 especially, as with some variations, the periodicity and/or sequence of the identifier changes are known). In addition, the beacon server 125 can return a set of N encrypted pairs with unencrypted values set to null or other cause particular transmissions by the beacon 105 to be ignored.

If the beacon server 125 determines client 115 is not authorized to know the beacon information, then response 245 may be that the beacon 105 is to be ignored for period of time and no further events occur until that period of time expires. Otherwise, at 250, the application triggering data may cause the software to notify the application it is associated with about the beacon 105 so that an action may be initiated. It will be appreciated that such application triggering data need not be returned immediately but it can be returned on a subsequent call/reply. In either event, the action/ignore events can be stored in the software's log for later transmission to the beacon server 125. With the former arrangement, in some cases, the call into the corresponding application can cause the client device, at 255, to transmit data to an application server 205 (i.e., a server associated with the application that was notified about the beacon 105, etc.) characterizing the call. The application server 205 can make a determination of which action should be initiated by the application (associated with the software) on the client device 115 and transmit further application triggering data, at 260, specifying such action or actions, if any. If the application server response 260 is that the beacon 105 is to be ignored for period of time, then no further events occur until that period of time expires. Otherwise, at 265, the application triggering data from the application server causes the software to notify the application it is associated with about the beacon 105 so that the corresponding action or actions may be initiated.

Figure 3:
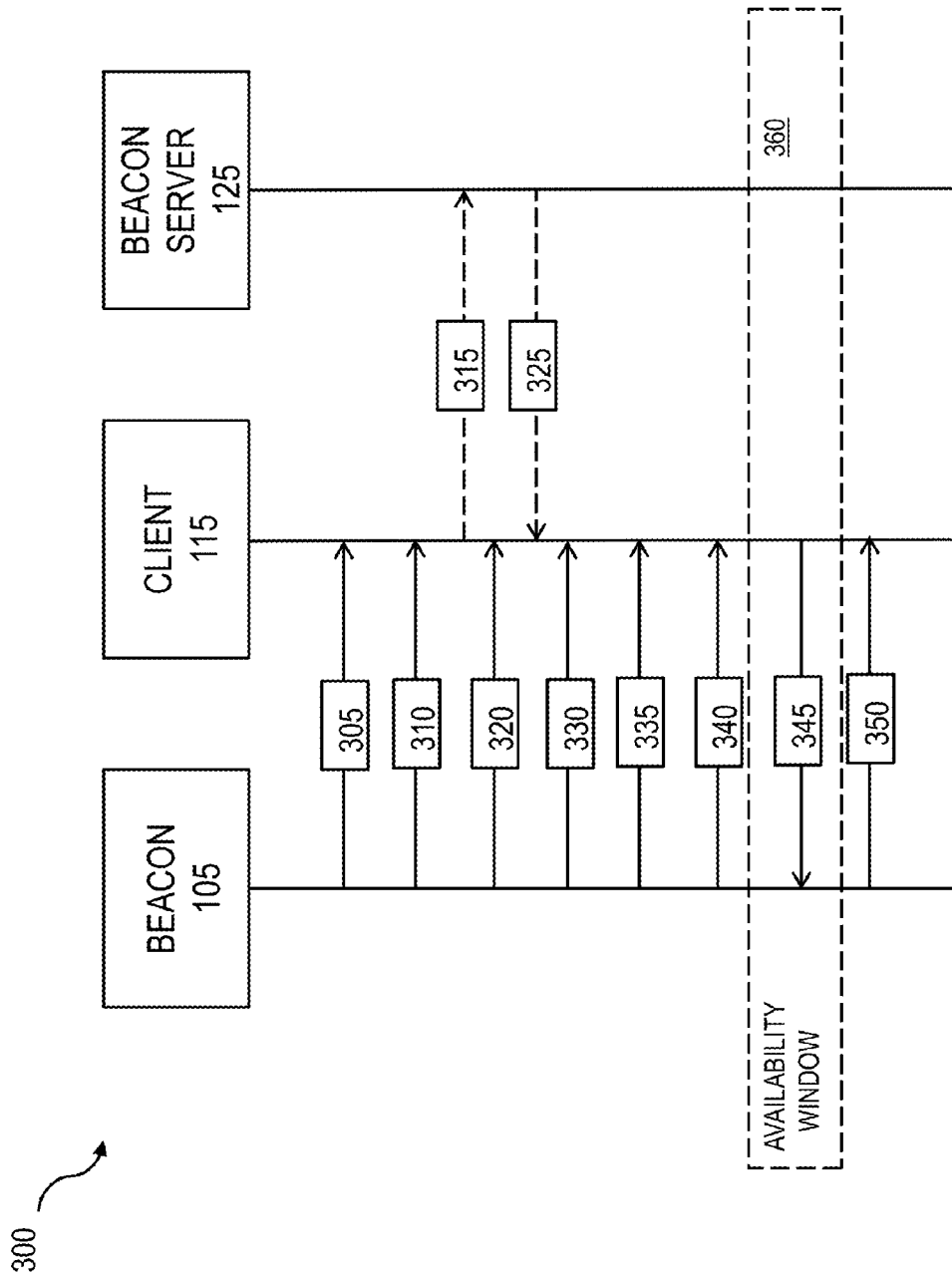
FIG. 3 is a first diagram illustrating signaling among a beacon, a client device, and a beacon server.

FIG. 3 is a third diagram 300 illustrating interaction among a beacon 105, a client device 115, and a beacon server 125. The beacon 105 can transmit a series of data packets 305, 310, 320, 330, 335, 340 that include an identifier for the beacon and which specify or otherwise characterize an availability window 360. During the availability window 360 a transceiver and/or receiver in the beacon 105 is available to receive data from the client device 115 that can, for example, change the firmware of the beacon 105 and/or one or more operating parameters of the beacon 105 or initiate a connection that will permit such an action of the beacon 105. The data packets 305-340 transmitted by the beacon 105 can identify a specific time for the availability window or they can, for example, be a countdown indicating how much time is left until the availability window 360 is opened. In some variations, the packets transmitted by the beacon 105 can also specify an amount of time in which the availability window 360 is open.

The client device 115 can, during the availability window 260, transmit one or more packets 345 to the beacon 105 to modify the firmware and/or one or more operating parameters of the beacon 105 or initiate a connection that will permit such an action to the beacon 105. Various operating parameters can be changed including, but not limited to: a rate at which the sequence of data packets is transmitted, whether or not a rolling code is transmitted in the sequence of data packets, a rate at which a rolling code encapsulated in the sequence of data packets is changed, a rate at which a media access control (MAC) address changes, power at which the sequence of data packets is transmitted, a universally unique identifier (UUID) for the beacon, a major value for the beacon (as specified by the iBeacon protocol), a minor value for the beacon (as specified by the iBeacon protocol), measured power for the beacon, a version/type of packets in the sequence of packets, a periodicity of the availability window, a length of time during which the availability window is open, or a timestamp for the availability window.

In some cases, the client device 115 can, after receiving a data packet specifying an availability window (e.g., packet 310) from the beacon 105, relay such data packet or transmit a new packet 315 specifying the availability window to the beacon server 125. The beacon server 125 can subsequently send one or more data packets 325 to the client device 115 that encapsulate data required to modify the firmware and/or the one or more operating parameters or initiate a connection that will permit such an action during the subsequent availability window 360. Stated differently, in some variations, the beacon server 125 can force the client device 115 to modify the firmware and/or one or more operating parameters of the beacon 105 during the availability window 360.

In some variations, the client device 115 as part of data packet 345 can specify a period of time for a subsequent availability window (not shown). Stated differently, the data packet 345 can cause the beacon to change the time at which the next subsequent availability window is to be opened (based on instructions from the client device 115).

Figure 4:
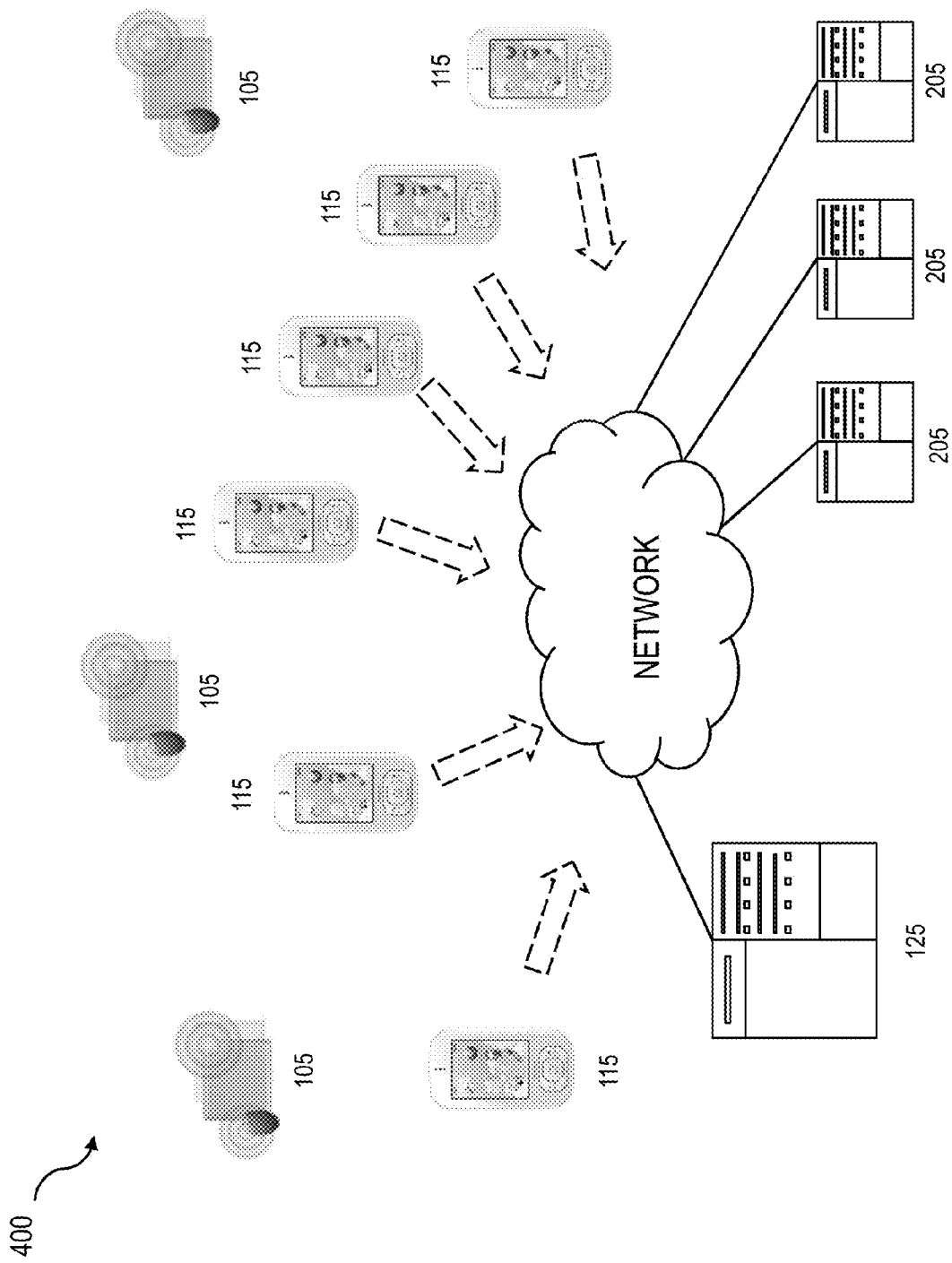
FIG. 4 is a diagram illustrating a system including a plurality of beacons, client devices, application servers and a beacon server.

With reference to diagram 400 of FIG. 4, it will be appreciated that signaling illustrated in FIGS. 1-3 can be among a plurality of beacons 105 distributed at different locations, client devices 115 used by different end-users, and application servers 205 associated with different applications (e.g., retail store application, coffee shop application, etc.). It will also be appreciated that there can, in some variations, be multiple beacon servers 125 (either redundant or particular to pre-determined beacons and/or software instances). Further, each client device 115 can have multiple instances of the software which in turn can interact individually based on the beacons 105 and any cached/received authorization and application triggering data.

The beacon server 125 can manage and/or interface with a platform that enables different account holders to detect the beacons 105 and/or to communicate with the beacons 105 during availability windows to change firmware and/or one or more operating parameters of the beacons 105. For example, the platform can associate a particular beacon with a particular account. The account holder for such account can then define what actions are triggered by a corresponding application when a particular associated beacon is detected. Stated differently, the account holder can define what actions will be triggered (and thus form part of the application triggering data sent by the beacon server 125 to the client device 115).

Figure 5:
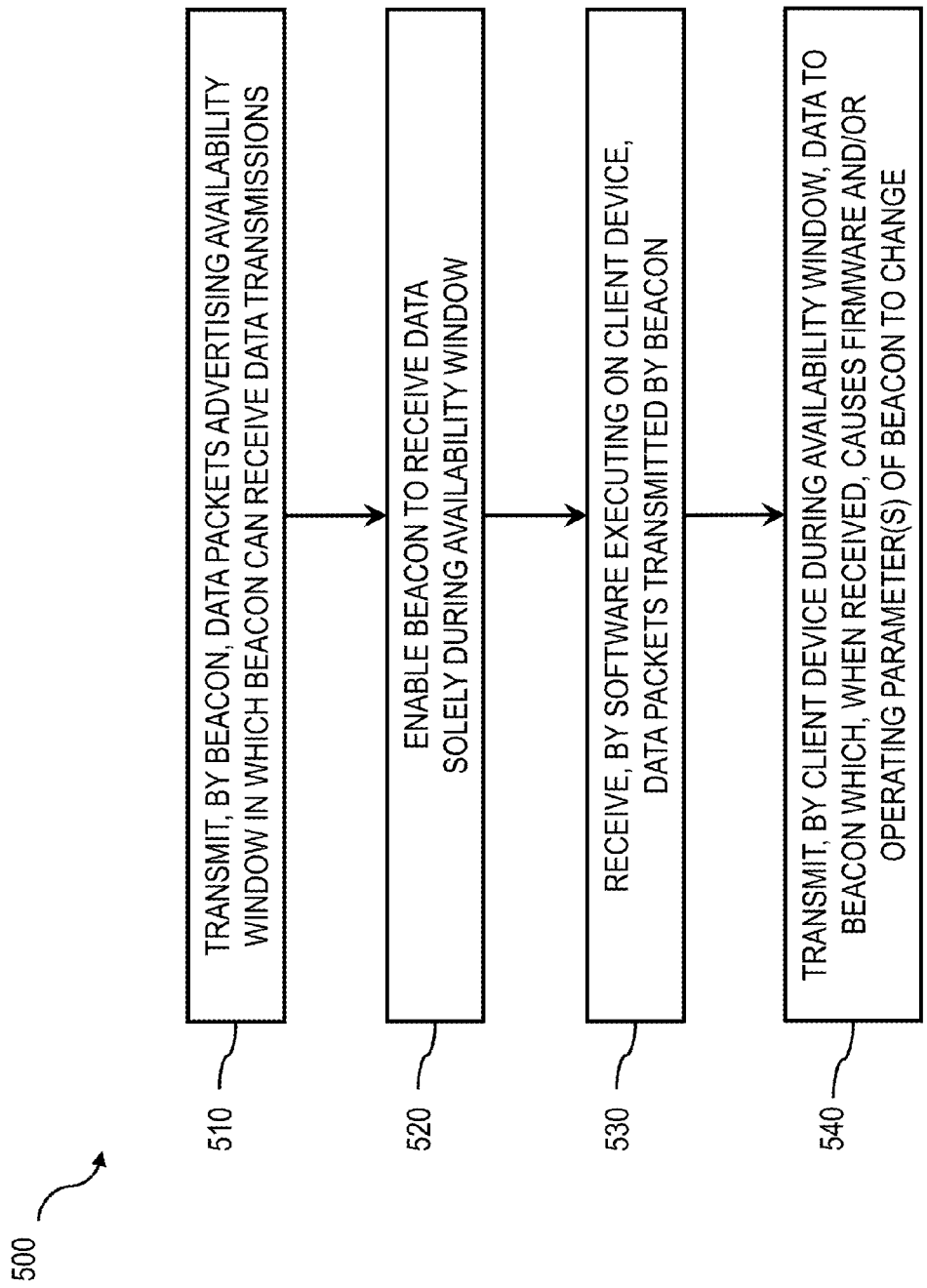
FIG. 5 is a diagram illustrating a process in which a beacon advertises an availability window in which the beacon can receive data packet transmission.

FIG. 5 is a diagram in which, at 510, a beacon wirelessly transmits a sequence of data packets that each include an identifier or a portion of an identifier (in some cases multiple packets can be used to specify a single identifier). A portion of the packets specify (i.e., advertise) an availability window during which a receiver (i.e., transceiver, dedicated receiver, etc.) forming part of the beacon can receive data transmissions. The receiver does not receive data transmissions outside of the availability window. Thereafter, at 520, the receiver is activated during the availability window to enable receipt of data transmissions to the beacon. Further, at 530, software executing on or accessed by a client device can wirelessly receive the sequence of data packets. Subsequently, at 540, solely during the availability window, the client device can transmit data transmissions to the beacon which, when received by the beacon, cause firmware and/or one or more operating parameters of the beacon to change or initiate a connection that will permit such an action.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   wirelessly transmitting, by a beacon, a sequence of one or more data packets that each or together comprise an identifier, wherein a portion of the packets specify an availability window during which a receiver forming part of the beacon can receive data transmissions, wherein the receiver does not receive data transmissions outside of the availability window;
   detecting, by software executing on or accessed by a client device, at least one packet transmitted by the beacon;
   relaying, by the client device, at least a portion of the transmitted packet to a server;
   determining, by the server and based on the relayed at least a portion of the transmitted packet, that the software is authorized to be informed of an identity and metadata of the beacon;
   transmitting, by the server to the client device, data comprising the identifier and metadata for the beacon; and
   activating the receiver during the availability window to enable receipt of data transmissions to the beacon.

2. The method of claim 1, wherein the availability window specifies an absolute time during which the beacon can receive data transmissions.

3. The method of claim 1, wherein the availability window specifies a relative time during which the beacon can receive data transmissions.

4. The method of claim 1 further comprising:
   receiving, by the beacon during the availability window, configuration information for the beacon.

5. The method of claim 4 further comprising:
   modifying firmware of the beacon in response to receipt of the configuration information.

6. The method of claim 5 further comprising:
   modifying at least one operating parameter of the beacon in response to receipt of the configuration information.

7. The method of claim 6, wherein the at least one operating parameter is selected from a group consisting of: a rate at which the sequence of data packets is transmitted, whether or not a rolling code is transmitted in the sequence of data packets, a rate at which a rolling code encapsulated in the sequence of data packets is changed, a rate at which a media access control (MAC) address changes, power at which the sequence of data packets is transmitted, a universally unique identifier (QUID) for the beacon, a major value for the beacon, a minor value for the beacon, measured power for the beacon, a version/type of packets in the sequence of packets, a periodicity of the availability window, a length of time during which the availability window is open, a timestamp for the availability window, or a time period for a subsequent availability window.

8. The method of claim 5, wherein modifying the firmware of the beacon comprises:
   opening a connection between the client device and a remote computing device to data encapsulating a firmware update; and
   transmitting, by the client device to the beacon, data encapsulating the firmware update.

9. The method of claim 1 further comprising:
   initiating, by the software executed on or accessed by the client device, at least one action using the identifier and the metadata.

10. The method of claim 1, wherein at least a portion of each data packet is obfuscated, and wherein the determination by the server comprises parsing the obfuscated at least a portion of each data packet.

11. The method of claim 1, wherein at least a portion of each data packet is obfuscated.

12. The method of claim 1 further comprising:
    determining, by the server and based on the relayed at least a portion of the transmitted packet, that the software is authorized to convey configuration information to the beacon; and
    transmitting, by the server to the client device, data comprising the configuration information for the beacon.

13. The method of claim 12 further comprising:
    transmitting, by the client device to the beacon during the availability window, data comprising the configuration information.

14. The method of claim 1, wherein the wireless transmission comprises at least one of: radio waves, audio waves, or light waves.

15. The method of claim 1 further comprising:
    determining, by the server and based on the relayed at least a portion of the transmitted at least one packet, that the software should modify firmware and/or one or more operating parameters of the beacon during the availability window; and
    transmitting, by the server to the client device, data for the client device to transmit to the beacon during the availability window which, when received by the beacon, causes the firmware and/or one or more operating parameters of the beacon to change.

16. A method comprising:
wirelessly receiving, by software executing on or accessed by a client device from a beacon, a sequence of one or more data packets that each or together comprise an identifier, wherein at least one of the packets specify an availability window during which a receiver forming part of the beacon can receive data transmissions, wherein the receiver does not receive data transmissions outside of the availability window;
relaying, by the client device, to a server, data encapsulating at least a portion of a packet transmitted by the beacon so that the server can determine that the software is authorized to be informed of an identity and metadata of the beacon;
receiving, by the client device, data comprising the identifier and metadata for the beacon; and
transmitting, by the client device to the beacon in response to the received data, data transmissions to the beacon solely during the availability window.

17. The method of claim 16, wherein the availability window specifies an absolute time during which the beacon can receive data transmissions.

18. The method of claim 16, wherein the availability window specifies a relative time during which the beacon can receive data transmissions.

19. The method of claim 16, wherein at least a portion of each data packet is obfuscated, and wherein the determination by the server comprises parsing the obfuscated at least a portion of each data packet.

20. The method of claim 16 further comprising:
determining, by the server and based on the relayed at least a portion of the transmitted packet, that the software is authorized to convey configuration information to the beacon; and
transmitting, by the server to the client device, data comprising the configuration information for the beacon.

21. The method of claim 16, wherein the wireless transmission comprises at least one of: radio waves, audio waves, or light waves.

22. A method comprising:
wirelessly transmitting, by a beacon, a sequence of one or more data packets that each or together comprise an identifier, wherein a portion of the packets specify an availability window during which a receiver forming part of the beacon can receive data transmissions, wherein the receiver does not receive data transmissions outside of the availability window;
detecting, by software executing on or accessed by a client device, at least one packet transmitted by the beacon;
relaying, by the client device, at least a portion of the transmitted packet to a server;
determining, by the server and based on the relayed at least a portion of the transmitted packet, that the software is authorized to convey configuration information to the beacon;
transmitting, by the server to the client device, data comprising the configuration information for the beacon; and
activating the receiver during the availability window to enable receipt of data transmissions to the beacon including the configuration information for the beacon.

23. The method of claim 22, wherein the availability window specifies an absolute time during which the beacon can receive data transmissions.

24. The method of claim 22, wherein the availability window specifies a relative time during which the beacon can receive data transmissions.

25. The method of claim 22 further comprising:
receiving, by the beacon during the availability window, configuration information for the beacon.

26. The method of claim 25 further comprising:
modifying firmware of the beacon in response to receipt of the configuration information.

27. The method of claim 26 further comprising:
modifying at least one operating parameter of the beacon in response to receipt of the configuration information.

28. The method of claim 27, wherein the at least one operating parameter is selected from a group consisting of: a rate at which the sequence of data packets is transmitted, whether or not a rolling code is transmitted in the sequence of data packets, a rate at which a rolling code encapsulated in the sequence of data packets is changed, a rate at which a media access control (MAC) address changes, power at which the sequence of data packets is transmitted, a universally unique identifier (QUID) for the beacon, a major value for the beacon, a minor value for the beacon, measured power for the beacon, a version/type of packets in the sequence of packets, a periodicity of the availability window, a length of time during which the availability window is open, a timestamp for the availability window, or a time period for a subsequent availability window.

29. The method of claim 26, wherein modifying the firmware of the beacon comprises:
opening a connection between the client device and a remote computing device to data encapsulating a firmware update; and
transmitting, by the client device to the beacon, data encapsulating the firmware update.

30. The method of claim 22, wherein at least a portion of each data packet is obfuscated.

31. The method of claim 30 further comprising:
transmitting, by the client device to the beacon during the availability window, data comprising the configuration information.

32. The method of claim 22, wherein the wireless transmission comprises at least one of: radio waves, audio waves, or light waves.

33. A method comprising:
wirelessly transmitting, by a beacon, a sequence of one or more data packets that each or together comprise an identifier, wherein a portion of the packets specify an availability window during which a receiver forming part of the beacon can receive data transmissions, wherein the receiver does not receive data transmissions outside of the availability window;
detecting, by software executing on or accessed by a client device, at least one packet transmitted by the beacon;
relaying, by the client device, at least a portion of the transmitted packet to a server;
determining, by the server and based on the relayed at least a portion of the transmitted at least one packet, that the software should modify firmware and/or one or more operating parameters of the beacon during the availability window;
transmitting, by the server to the client device, data for the client device to transmit to the beacon during the availability window which, when received by the beacon, causes the firmware and/or one or more operating parameters of the beacon to change; and
activating the receiver during the availability window to enable receipt of data transmissions to the beacon including the configuration information for the beacon.

34. The method of claim 33, wherein the availability window specifies an absolute time during which the beacon can receive data transmissions.

35. The method of claim 33, wherein the availability window specifies a relative time during which the beacon can receive data transmissions.

36. The method of claim 33, wherein the at least one operating parameter is selected from a group consisting of: a rate at which the sequence of data packets is transmitted, whether or not a rolling code is transmitted in the sequence of data packets, a rate at which a rolling code encapsulated in the sequence of data packets is changed, a rate at which a media access control (MAC) address changes, power at which the sequence of data packets is transmitted, a universally unique identifier (QUID) for the beacon, a major value for the beacon, a minor value for the beacon, measured power for the beacon, a version/type of packets in the sequence of packets, a periodicity of the availability window, a length of time during which the availability window is open, a timestamp for the availability window, or a time period for a subsequent availability window.

37. The method of claim 33, wherein modifying the firmware of the beacon comprises:
opening a connection between the client device and a remote computing device to data encapsulating a firmware update; and
transmitting, by the client device to the beacon, data encapsulating the firmware update.

38. The method of claim 33, wherein at least a portion of each data packet is obfuscated.

39. The method of claim 38 further comprising:
transmitting, by the client device to the beacon during the availability window, data comprising the configuration information.

40. The method of claim 33, wherein the wireless transmission comprises at least one of: radio waves, audio waves, or light waves.

41. A method comprising:
wirelessly receiving, by software executing on or accessed by a client device from a beacon, a sequence of one or more data packets that each or together comprise an identifier, wherein at least one of the packets specify an availability window during which a receiver forming part of the beacon can receive data transmissions, wherein the receiver does not receive data transmissions outside of the availability window;
relaying, by the client device, to a server, data encapsulating at least a portion of a packet transmitted by the beacon so that the server can determine that the software is authorized to convey configuration information to the beacon;
transmitting, by the server to the client device, data comprising the configuration information for the beacon;
receiving, by the client device, data comprising the configuration information for the beacon; and
transmitting, by the client device to the beacon in response to the received data, data transmissions comprising the configuration information to the beacon solely during the availability window.

42. The method of claim 41, wherein the availability window specifies an absolute time during which the beacon can receive data transmissions.

43. The method of claim 41, wherein the availability window specifies a relative time during which the beacon can receive data transmissions.

44. The method of claim 41, wherein at least a portion of each data packet is obfuscated, and wherein the determination by the server comprises parsing the obfuscated at least a portion of each data packet.

45. The method of claim 41, wherein the wireless transmission comprises at least one of: radio waves, audio waves, or light waves.

46. A method comprising:
wirelessly receiving, by software executing on or accessed by a client device from a beacon, a sequence of one or more data packets that each or together comprise an identifier, wherein at least one of the packets specify an availability window during which a receiver forming part of the beacon can receive data transmissions, wherein the receiver does not receive data transmissions outside of the availability window;
relaying, by the client device, to a server, data encapsulating at least a portion of a packet transmitted by the beacon so that the server can determine that the software should modify firmware and/or one or more operating parameters of the beacon during the availability window;
transmitting, by the server to the client device, data for the client device to transmit to the beacon during the availability window which, when received by the beacon, causes the firmware and/or one or more operating parameters of the beacon to change;
receiving, by the client device, data to causes the firmware and/or one or more operating parameters of the beacon to change; and
transmitting, by the client device to the beacon in response to the received data, data transmissions including at least a portion of the received data to the beacon solely during the availability window.

47. The method of claim 46, wherein the availability window specifies an absolute time during which the beacon can receive data transmissions.

48. The method of claim 46, wherein the availability window specifies a relative time during which the beacon can receive data transmissions.

49. The method of claim 46, wherein at least a portion of each data packet is obfuscated, and wherein the determination by the server comprises parsing the obfuscated at least a portion of each data packet.

50. The method of claim 46, wherein the wireless transmission comprises at least one of: radio waves, audio waves, or light waves.

51. The method of claim 46, wherein the at least one operating parameter is selected from a group consisting of: a rate at which the sequence of data packets is transmitted, whether or not a rolling code is transmitted in the sequence of data packets, a rate at which a rolling code encapsulated in the sequence of data packets is changed, a rate at which a media access control (MAC) address changes, power at which the sequence of data packets is transmitted, a universally unique identifier (QUID) for the beacon, a major value for the beacon, a minor value for the beacon, measured power for the beacon, a version/type of packets in the sequence of packets, a periodicity of the availability window, a length of time during which the availability window is open, a timestamp for the availability window, or a time period for a subsequent availability window.

52. A system comprising:
a beacon comprising at least one data processor and a receiver;
a client device comprising at least one data processor and memory; and a server comprising at least one data processor and memory;

wherein the beacon, client device, and server perform operations comprising:

wirelessly transmitting, by the beacon, a sequence of one or more data packets that each or together comprise an identifier, wherein a portion of the packets specify an availability window during which the receiver forming part of the beacon can receive data transmissions, wherein the receiver does not receive data transmissions outside of the availability window;

detecting, by software executing on or accessed by the client device, at least one packet transmitted by the beacon;

relaying, by the client device, at least a portion of the transmitted packet to the server;

determining, by the server and based on the relayed at least a portion of the transmitted packet, that the software is authorized to be informed of an identity and metadata of the beacon;

transmitting, by the server to the client device, data comprising the identifier and metadata for the beacon; and activating the receiver during the availability window to enable receipt of data transmissions to the beacon.

53. The system of claim 52, wherein the availability window specifies an absolute time during which the beacon can receive data transmissions.

54. The system of claim 52, wherein the availability window specifies a relative time during which the beacon can receive data transmissions.

55. The system of claim 52, wherein the operations further comprise:

receiving, by the beacon during the availability window, configuration information for the beacon.

56. The system of claim 55, wherein the operations further comprise:

modifying firmware of the beacon in response to receipt of the configuration information.

57. The system of claim 56, wherein the operations further comprise:

modifying at least one operating parameter of the beacon in response to receipt of the configuration information.

58. The system of claim 57, wherein the at least one operating parameter is selected from a group consisting of: a rate at which the sequence of data packets is transmitted, whether or not a rolling code is transmitted in the sequence of data packets, a rate at which a rolling code encapsulated in the sequence of data packets is changed, a rate at which a media access control (MAC) address changes, power at which the sequence of data packets is transmitted, a universally unique identifier (QUID) for the beacon, a major value for the beacon, a minor value for the beacon, measured power for the beacon, a version/type of packets in the sequence of packets, a periodicity of the availability window, a length of time during which the availability window is open, a timestamp for the availability window, or a time period for a subsequent availability window.

59. The method of claim 56, wherein modifying the firmware of the beacon comprises:

opening a connection between the client device and a remote computing device to data encapsulating a firmware update; and transmitting, by the client device to the beacon, data encapsulating the firmware update.

60. The system of claim 52, wherein the operations further comprise:

initiating, by the software executed on or accessed by the client device, at least one action using the identifier and the metadata.

61. The system of claim 52, wherein at least a portion of each data packet is obfuscated, and wherein the determination by the server comprises parsing the obfuscated at least a portion of each data packet.

62. The system of claim 52, wherein at least a portion of each data packet is obfuscated.

63. The system of claim 52, wherein the operations further comprise:

determining, by the server and based on the relayed at least a portion of the transmitted packet, that the software is authorized to convey configuration information to the beacon; and transmitting, by the server to the client device, data comprising the configuration information for the beacon.

64. The system of claim 63, wherein the operations further comprise:

transmitting, by the client device to the beacon during the availability window, data comprising the configuration information.

65. The system of claim 52, wherein the wireless transmission comprises at least one of: radio waves, audio waves, or light waves.

66. The system of claim 52, wherein the operations further comprise:

determining, by the server and based on the relayed at least a portion of the transmitted at least one packet, that the software should modify firmware and/or one or more operating parameters of the beacon during the availability window; and transmitting, by the server to the client device, data for the client device to transmit to the beacon during the availability window which, when received by the beacon, causes the firmware and/or one or more operating parameters of the beacon to change.

67. A system comprising:

at least one data processor; and memory storing instructions which, when executed by the at least one data processor, result in operations comprising:

wirelessly receiving, by software executing on or accessed by a client device from a beacon, a sequence of one or more data packets that each or together comprise an identifier, wherein at least one of the packets specify an availability window during which a receiver forming part of the beacon can receive data transmissions, wherein the receiver does not receive data transmissions outside of the availability window;

relaying, by the client device, to a server, data encapsulating at least a portion of a packet transmitted by the beacon so that the server can determine that the software is authorized to be informed of an identity and metadata of the beacon;

receiving, by the client device, data comprising the identifier and metadata for the beacon; and transmitting, by the client device to the beacon in response to the received data, data transmissions to the beacon solely during the availability window.

68. The system of claim 67, wherein the availability window specifies an absolute time during which the beacon can receive data transmissions.

69. The system of claim 67, wherein the availability window specifies a relative time during which the beacon can receive data transmissions.

70. The system of claim 67, wherein at least a portion of each data packet is obfuscated, and wherein the determination by the server comprises parsing the obfuscated at least a portion of each data packet.

71. The system of claim 67, wherein the operations further comprise:

determining, by the server and based on the relayed at least a portion of the transmitted packet, that the software is authorized to convey the configuration information to the beacon; and transmitting, by the server to the client device, data comprising the configuration information for the beacon.

72. The system of claim 67, wherein the wireless transmission comprises at least one of: radio waves, audio waves, or light waves.

73. A system comprising:
a beacon comprising at least one data processor and a receiver;
a client device comprising at least one data processor and memory; and
a server comprising at least one data processor and memory;
wherein the beacon, client device, and server perform operations comprising:
wirelessly transmitting, by the beacon, a sequence of one or more data packets that each or together comprise an identifier, wherein a portion of the packets specify an availability window during which the receiver forming part of the beacon can receive data transmissions, wherein the receiver does not receive data transmissions outside of the availability window;
detecting, by software executing on or accessed by a client device, at least one packet transmitted by the beacon;
relaying, by the client device, at least a portion of the transmitted packet to the server;
determining, by the server and based on the relayed at least a portion of the transmitted packet, that the software is authorized to convey configuration information to the beacon;
transmitting, by the server to the client device, data comprising the configuration information for the beacon; and
activating the receiver during the availability window to enable receipt of data transmissions to the beacon including the configuration information for the beacon.

74. The system of claim 73, wherein the availability window specifies an absolute time during which the beacon can receive data transmissions.

75. The system of claim 73, wherein the availability window specifies a relative time during which the beacon can receive data transmissions.

76. The system of claim 73, wherein the operations further comprise:
receiving, by the beacon during the availability window, configuration information for the beacon.

77. The system of claim 76, wherein the operations further comprise:
modifying firmware of the beacon in response to receipt of the configuration information.

78. The system of claim 77, wherein the operations further comprise:
modifying at least one operating parameter of the beacon in response to receipt of the configuration information.

79. The system of claim 78, wherein the at least one operating parameter is selected from a group consisting of: a rate at which the sequence of data packets is transmitted, whether or not a rolling code is transmitted in the sequence of data packets, a rate at which a rolling code encapsulated in the sequence of data packets is changed, a rate at which a media access control (MAC) address changes, power at which the sequence of data packets is transmitted, a universally unique identifier (QUID) for the beacon, a major value for the beacon, a minor value for the beacon, measured power for the beacon, a version/type of packets in the sequence of packets, a periodicity of the availability window, a length of time during which the availability window is open, a timestamp for the availability window, or a time period for a subsequent availability window.

80. The system of claim 77, wherein modifying the firmware of the beacon comprises:
opening a connection between the client device and a remote computing device to data encapsulating a firmware update; and
transmitting, by the client device to the beacon, data encapsulating the firmware update.

81. The system of claim 73, wherein at least a portion of each data packet is obfuscated.

82. The system of claim 81, wherein the operations further comprise:
transmitting, by the client device to the beacon during the availability window, data comprising the configuration information.

83. The system of claim 73, wherein the wireless transmission comprises at least one of: radio waves, audio waves, or light waves.

84. A system comprising:
a beacon comprising at least one data processor and a receiver;
a client device comprising at least one data processor and memory; and
a server comprising at least one data processor and memory;
wherein the beacon, client device, and server perform operations comprising:
wirelessly transmitting, by the beacon, a sequence of one or more data packets that each or together comprise an identifier, wherein a portion of the packets specify an availability window during which the receiver forming part of the beacon can receive data transmissions, wherein the receiver does not receive data transmissions outside of the availability window;
detecting, by software executing on or accessed by the client device, at least one packet transmitted by the beacon;
relaying, by the client device, at least a portion of the transmitted packet to the server;
determining, by the server and based on the relayed at least a portion of the transmitted at least one packet, that the software should modify firmware and/or one or more operating parameters of the beacon during the availability window;
transmitting, by the server to the client device, data for the client device to transmit to the beacon during the availability window which, when received by the beacon, causes the firmware and/or one or more operating parameters of the beacon to change; and
activating the receiver during the availability window to enable receipt of data transmissions to the beacon including the configuration information for the beacon.

85. The system of claim 84, wherein the availability window specifies an absolute time during which the beacon can receive data transmissions.

86. The system of claim 84, wherein the availability window specifies a relative time during which the beacon can receive data transmissions.

87. The system of claim 84, wherein the at least one operating parameter is selected from a group consisting of: a rate at which the sequence of data packets is transmitted, whether or not a rolling code is transmitted in the sequence of data packets, a rate at which a rolling code encapsulated in the sequence of data packets is changed, a rate at which a media access control (MAC) address changes, power at which the sequence of data packets is transmitted, a universally unique identifier (QUID) for the beacon, a major value for the beacon, a minor value for the beacon, measured power for the beacon, a version/type of packets in the sequence of packets, a periodicity of the availability window, a length of time during which the availability window is open, a timestamp for the availability window, or a time period for a subsequent availability window.

88. The system of claim 84, wherein modifying the firmware of the beacon comprises:
opening a connection between the client device and a remote computing device to data encapsulating a firmware update; and
transmitting, by the client device to the beacon, data encapsulating the firmware update.

89. The system of claim 84, wherein at least a portion of each data packet is obfuscated.

90. The system of claim 89, wherein the operations further comprise:
transmitting, by the client device to the beacon during the availability window, data comprising the configuration information.

91. The system of claim 84, wherein the wireless transmission comprises at least one of: radio waves, audio waves, or light waves.

92. A system comprising:
at least one data processor; and
memory storing instructions which, when executed by the at least one data processor, result in operations comprising:
wirelessly receiving, by software executing on or accessed by a client device from a beacon, a sequence of one or more data packets that each or together comprise an identifier, wherein at least one of the packets specify an availability window during which a receiver forming part of the beacon can receive data transmissions, wherein the receiver does not receive data transmissions outside of the availability window;
relaying, by the client device, to a server, data encapsulating at least a portion of a packet transmitted by the beacon so that the server can determine that the software is authorized to convey configuration information to the beacon;
transmitting, by the server to the client device, data comprising the configuration information for the beacon;
receiving, by the client device, data comprising the configuration information for the beacon; and
transmitting, by the client device to the beacon in response to the received data, data transmissions comprising the configuration information to the beacon solely during the availability window.

93. The system of claim 92, wherein the availability window specifies an absolute time during which the beacon can receive data transmissions.

94. The system of claim 92, wherein the availability window specifies a relative time during which the beacon can receive data transmissions.

95. The system of claim 92, wherein at least a portion of each data packet is obfuscated, and wherein the determination by the server comprises parsing the obfuscated at least a portion of each data packet.

96. The system of claim 92, wherein the wireless transmission comprises at least one of: radio waves, audio waves, or light waves.

97. A system comprising:
at least one data processor; and
memory storing instructions which, when executed by the at least one data processor, result in operations comprising:
wirelessly receiving, by software executing on or accessed by a client device from a beacon, a sequence of one or more data packets that each or together comprise an identifier, wherein at least one of the packets specify an availability window during which a receiver forming part of the beacon can receive data transmissions, wherein the receiver does not receive data transmissions outside of the availability window;
relaying, by the client device, to a server, data encapsulating at least a portion of a packet transmitted by the beacon so that the server can determine that the software should modify firmware and/or one or more operating parameters of the beacon during the availability window;
transmitting, by the server to the client device, data for the client device to transmit to the beacon during the availability window which, when received by the beacon, causes the firmware and/or one or more operating parameters of the beacon to change;
receiving, by the client device, data to causes the firmware and/or one or more operating parameters of the beacon to change; and
transmitting, by the client device to the beacon in response to the received data, data transmissions including at least a portion of the received data to the beacon solely during the availability window.

98. The system of claim 97, wherein the availability window specifies an absolute time during which the beacon can receive data transmissions.

99. The system of claim 97, wherein the availability window specifies a relative time during which the beacon can receive data transmissions.

100. The system of claim 97, wherein at least a portion of each data packet is obfuscated, and wherein the determination by the server comprises parsing the obfuscated at least a portion of each data packet.

101. The system of claim 97, wherein the wireless transmission comprises at least one of: radio waves, audio waves, or light waves.

102. The system of claim 97, wherein the at least one operating parameter is selected from a group consisting of: a rate at which the sequence of data packets is transmitted, whether or not a rolling code is transmitted in the sequence of data packets, a rate at which a rolling code encapsulated in the sequence of data packets is changed, a rate at which a media access control (MAC) address changes, power at which the sequence of data packets is transmitted, a universally unique identifier (QUID) for the beacon, a major value for the beacon, a minor value for the beacon, measured power for the beacon, a version/type of packets in the sequence of packets, a periodicity of the availability window, a length of time during which the availability window is open, a timestamp for the availability window, or a time period for a subsequent availability window.

* * * * *